(12) United States Patent
Sheridan

(10) Patent No.: US 6,256,965 B1
(45) Date of Patent: Jul. 10, 2001

(54) PLUSH TOY BED

(76) Inventor: Anna Sheridan, 87365 Green Hill Rd. No. One, Eugene, OR (US) 97402

( * ) Notice: Subject to any disclaimer, the term of this patent is extended or adjusted under 35 U.S.C. 154(b) by 0 days.

(21) Appl. No.: 09/410,453

(22) Filed: Oct. 1, 1999

Related U.S. Application Data

(60) Provisional application No. 60/127,987, filed on Apr. 6, 1999.

(51) Int. Cl.[7] .................................................. B65B 63/02
(52) U.S. Cl. .................................. 53/436; 53/452; 5/93.1
(58) Field of Search .................... 53/436, 452; 206/457; 5/93.1, 97, 98.1; 29/91.1, 91.2, 91.5, 91.6, 91.7

(56) References Cited

U.S. PATENT DOCUMENTS

| | | | | |
|---|---|---|---|---|
| 4,754,512 | * | 7/1988 | Chao-Yang | ............................. 5/420 |
| 4,800,600 | * | 1/1989 | Baum | ...................................... 5/420 |
| 5,515,559 | * | 5/1996 | Benson | ................................... 5/420 |

* cited by examiner

*Primary Examiner*—Peter Vo
*Assistant Examiner*—Nathaniel Chukwurah
(74) *Attorney, Agent, or Firm*—John Halamka

(57) ABSTRACT

A method for the design and fabrication to reproduce a preselected subject matter such as a wild animal in a material comfort object incorporating a cavity that may be enhanced into an enclave by incorporating preselected portions of the subject matter such as a head or legs to add a surround to the cavity, giving preference to reproducing areas of the subject matter with plush material which resembles the color and texture of the subject matter while maintaining easy access to the cavity thereby presenting an exposed surface or comfort panel that is soft, warm and inviting to the user of the object. A sound reproduction device may be added to the object to provide preselected sounds, a child safe pocket may be formed in the object to hold the sound reproduction device.

4 Claims, 5 Drawing Sheets

PLUSH TOY BED

This application is based upon the Provisional Patent filed Apr. 6, 1999 as Ser. No. 60/127,987.

BACKGROUND OF THE INVENTION

1. Field of the Invention

This invention relates to the art of designing and fabricating a plush toy which closely resembles the preselected subject while maintaining an attractive yet comforting enclave into which the user of the plush toy device may snuggle to feel protected, safe and warm, thus suitable to be used as a bed for a pet or a child.

2. Description of the Prior Art

The art of designing and fabricating plush toys has a long history and many variations. As the plush toy device evolved from a simple cotton work sock stuffed and stitched to resemble a monkey to the family of stylized toy friends filled with beans (polymer beads). The prior art lacks any teaching of forming an enclave within the design with the placement of appropriate appendages to provide additional encapsulation of the user within the enclave while not detracting from the preselected thematic presentation to produce devices for a preselected user.

Currently there are many types of devices that may be used to provide a comforting resting niche to a child or a pet. Most of the devices can be lumped into a group referred to as "pillow with basket" consisting of a receptacle into which an overstuffed pillow or oversized sheet of fluffy material may be inserted. However, this type of arrangement does not enable the user to construct an enclave space that holds its shape, form and function.

The device designed and fabricated according to the teachings of this invention produces a pattern based on the anatomic style of a selected form such as a wild animal. The pattern is used with a preselected material such as a sheet of plush fabric to construct an out of the womb cavity which provides a device which may be deployed inside the abode of an owner or parent to provide emotional support to a user such as a wild animal, domestic animal or small child, much the way a nest provides support for birds and animals in the wild.

This device acts as a surrogate mother or pet parent and provides a soft, warm, surface fabricated of sheet material such as imitation fur of a preselected design, color, thickness and composition, that touches and cradles the user into relaxation. The user such as pets feel safe, sheltered, and warm in the thick material shaped to provide an enclave in which the user may easily fall comfortably asleep as the design and fabrication provides a device which insulates the loss of body heat through the base of the device while the surround portion of the device absorbs the body heat of the user and maintains the cavity at a temperature which has a high comfort level to the user.

The current art provides many plush pillow devices available to perform the function of a bed for a pet or a small child. None have solved the problem of holding a shape that produces a cavity or enclave to surround the user of the bed. In the current art pillows must be fluffed and repositioned or folded upon initiation of each use to produce even the most basic covering or nest environment for the user.

Solutions to eliminate the repositioning or refolding use hard structures such as a basket, box or the like to hold the pillow in a desired attitude or shape. This solution results in a border of stiff, usually unyielding frame which is unattractive and could inflict injury or pain upon contact with the user. It is known that cats enjoy kneading into soft contours of their bedding before lying down. Animal behaviorists believe when animals such as the cat and others are born, they are a blind, helpless bundle of fur in search of warmth and food. When they cuddle against mom and find a teat, they knead the area with their paws while suckling to make sure the milk supply keeps coming. This behavior of pushing with the paws continues upon encountering a nurturing environment. The user of the prior art device may encounter the hard support structure and become injured or at least discouraged from using the device.

Contrary to the devices produced by the prior art a device constructed according to the teaching of this invention produce a product that is soft, inviting, and provides a warm environment.

Other research has found that listening to rhythmical sounds such as heartbeats are very soothing to children and animals. These sounds seem to block out whatever internal or external discomforts are bothering the listener.

Thus, there has long been a need for an arrangement which allows the user, be it a wild or domestic animal, a child or even an adult, to safely and easily enter without preparation (other than the user's final kneading) and simply snuggle into an enclave which is soft, warm and inviting.

It is desired that the arrangement be based upon the combined expertise of scientists, wild and endangered animal trainers, medical doctors, and psychologists as well as scientific field studies and reports. A partial list of such scientific resources is: Penelope Leach, Ph.D., Lee Zasloff, Ph.D. and Aline H. Kidd. Ph.D., Research Coordinators, School of Veterinary Medicine, University of California, Davis, Calif., Jeffery Moussaieff Masson, Ph.D., Dr. Jeanne Cavelos, Astro Physicist, Eddie William, Education Curator Endangered Animals, Wildlife Safari, Cynthia Gamble, Wild Animal Trainer, Center for Endangered Cats, Stevanne Auervach, Ph.D, Drs. Liebl, Done, Merriman, Elston, and Browining, D. V. M.'s.

It is further desired that the arrangement provide an environment for the user which may reduce depression, loneliness and calm fears as well as provide a surround in which an instinctive sense of safety is nurtured in a manner similar to that produced by nests which protect baby animals that are typically small, inept, and defenseless.

It is further desired that by being the provider of such an arrangement, the user may be encouraged to grow attached to and become imprinted to the provider.

It is further desired that the arrangement assist in alleviating the loneliness that frequently results from domesticity of captive animals.

It is further desired that the engagement provide a comfort object (analogous to the adoption of the teddy bear or other beloved objects) that may stand in for absent mothers as sort of a talisman of security, safety and affection so that the object will probably be the users most emotionally important possession. The attachment may be described as contact comfort; something that once discovered is easy to remedy.

It is desired that the device incorporate warm, textured materials that provide contact comfort and provide a cozy surface to which the user may press against as well as feel wrapped in warmth and security as if closely held.

It is further desired that the device provide an environment similar to the voices, mother's heartbeats, or other sounds the user may prefer such as repetitive rhythmical sounds that the user may have lived with before in the womb.

SUMMARY OF THE INVENTION

Accordingly, it is an object of the present invention to provide a design and method of fabrication for a plush toy guided by a combination of the knowledge of experts, confirmed by scientific studies and developed within an analysis that comprehends the needs of animals not placed in a hierarchy with human beings but as a spectrum of creature commonality with the goal of having the animal grow attached to and become imprinted upon the human who provides the device.

It is an object of the present invention to provide an arrangement that may reduce depression, separation anxiety, and calm emotions while providing a nurturing surround within which the user instinctively senses safety.

It is another object of the present invention to provide a method of fabricating an arrangement presented as an enclosure yet readily presents an exposed surface that may be easily contacted by the user while rendering an impression of warmth, comfort and security.

It is yet another object of the present invention to provide a means of introducing sounds into the environment of the device. Such sounds being preselected to be familiar to the user to generate an association of the device with former pleasant experiences of the user.

It is yet another object of the present invention to provide a device that may be placed in a preselected location without the need for an auxiliary support structure, internal or external, or extensive adjustment by the mover to retain the shape of the device.

The above and other objects of the present invention are achieved, according to a preferred embodiment thereof, by providing an improved plush toy design and fabrication method to produce a recognizable shape incorporating a cavity with appendages adding to the formation of the cavity as an enclave.

BRIEF DESCRIPTION OF THE DRAWINGS

The above and other embodiments of the present invention may be more fully understood from the following detailed description, taken together with the accompanying drawings, wherein similar reference characters refer to similar elements throughout, and in which.

DETAILED DESCRIPTION OF THE INVENTION

The method of designing and fabricating a device according to the teaching of this invention involves the selection of the subject matter, the rendering of a model which is physically coherent in size and shape so that it is easily recognizable but not repulsive on being noticed. This is particularly critical in selecting which portion of the subject matter to leave out to create the cavity and which portions of the subject matter to use to enhance the cavity into an enclave.

The fabrication of the model into an object includes the translation of selected features of the subject such as a particular area having a color and texture, sizing each feature, and combining these areas into the overall device.

The step of selection of material to represent the selected feature with fabric such as plush or woven requires a review of offerings from mills. In the fabric world it is sometimes difficult to specify precisely the shade, color and fiber content for each particular area. Much depends up the ability to adapt what is available to fit a particular need.

The following Examples illustrate the present invention.

EXAMPLE 1

Figure 1A:
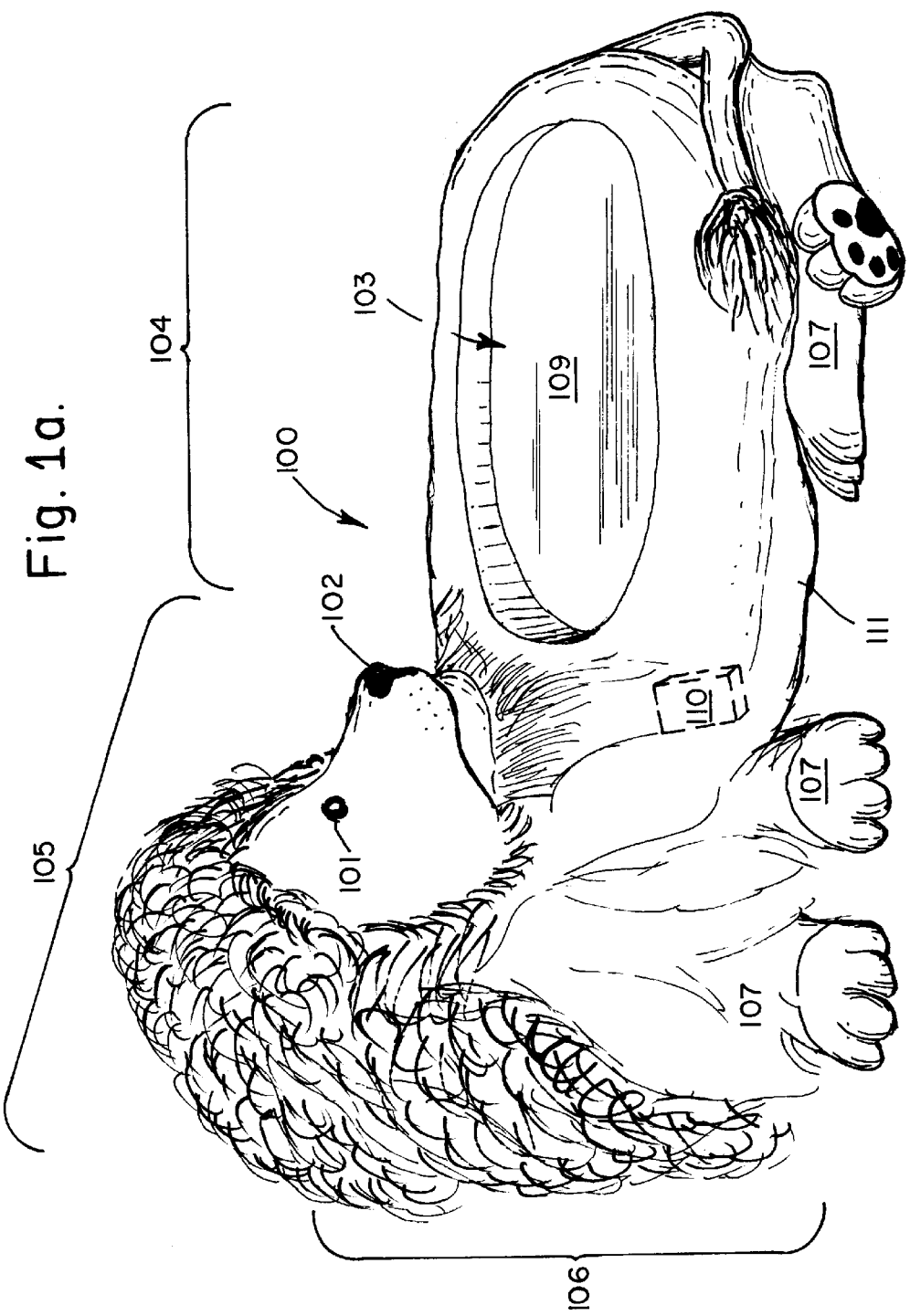
FIGS. 1a, b and c are perspective views of a device modeled after a lion according to the teaching of this invention.
Figure 1B:
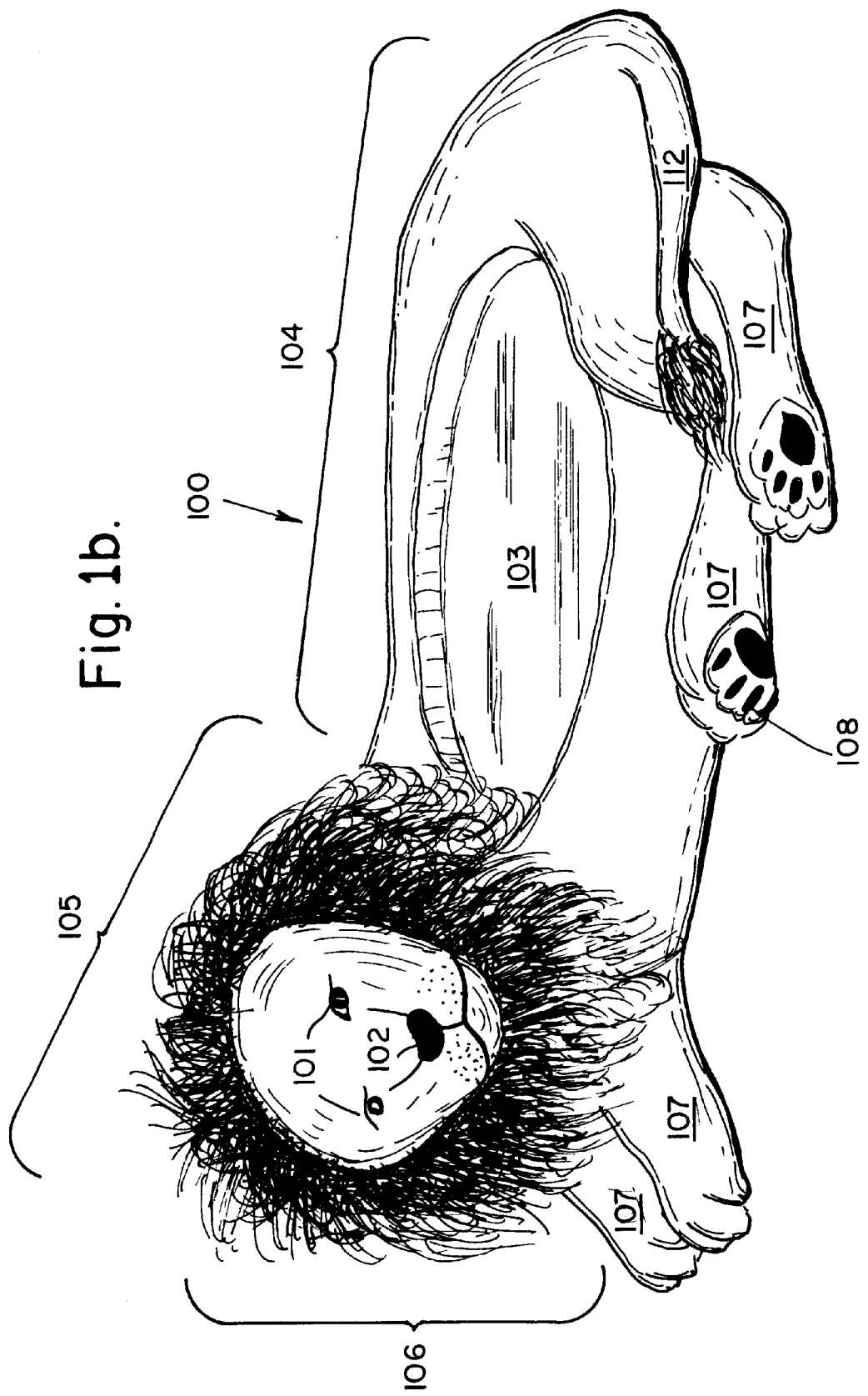
Figure 1C:
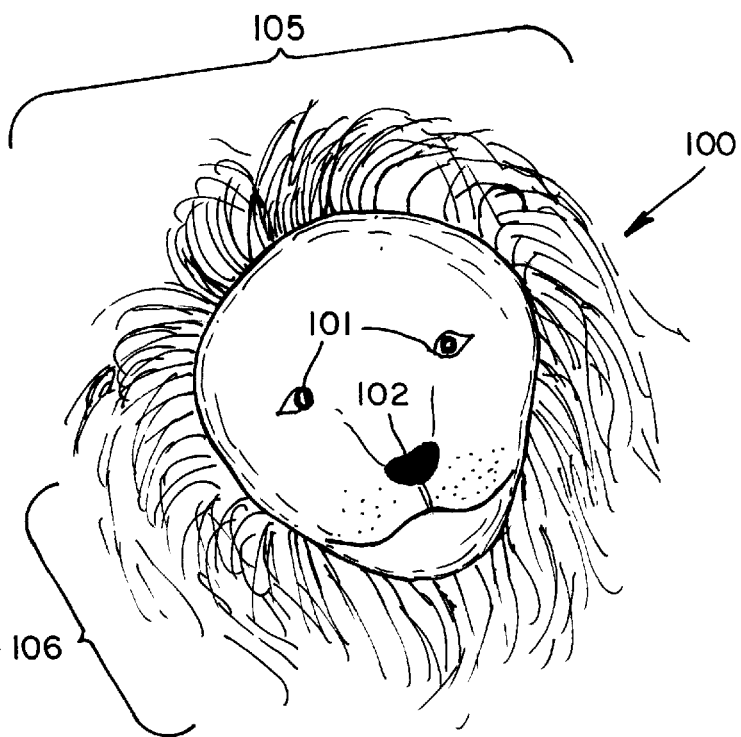

Referring now to the drawing, FIGS. 1a, b and c. They illustrate the fabrication of plush material in preselected pile depths to simulate the appearance of a lion, generally designated 100 and having a body portion 104 and a head portion 105.

The overall function of the invention herein is best understood from FIG. 1a. A cavity 103 is fabricated in the body portion 104 of the device with the head portion 105 of the lion fabricated as an overlying structure to provide an enclave for the cavity 103.

The size of the cavity can be adjusted as well as the height of the walls forming the perimeter of the cavity. The cavity can also be adjusted by placing the subject matter on its back or on its side. Each of these placements is what is known as a non-threatening posture. Should the device be depicted as standing on all four legs or upright on two legs, the device could be interpreted as being threatening to the user.

In the case of the lion depicted by FIGS. 1a, b and c, the device is fabricated of 23 pieces using 5 selections of fabric:
  a. 13 pieces of a tawny gold hi-pile, 12/15 mm, for the tummy, base, legs, tail, head spreader, face back outside panel and ear;
  b. 4 pieces using golden shag for the head and tail tip;
  c. 2 pieces using tan vonnel, approximately 5 mm for the paws;
  d. 2 pieces using brown suedette for the back center paw and back toes;
  e. 1 piece black velboa for the nose; and,
  f. 1 piece white hi-pile, 18/23 mm, for the chin.

Other miscellaneous items are trim fabricated of dark brown pearl cotton floss and embroidered to form the mount line and divet under the nose, eyes with a backing of circle of black felt, and a dark brown spray to add accent around the eyes and lightly mist the forehead and nose. Stuffing of fiber and foam and a base pad of firm polyester polyurethane foam complete the parts list.

The pieces are stitched together using small, even stitches with no broken threads and backstitched at the ends of seams. Particular attention must be given to the direction of the plush material in cutting and assembly in order to maintain the shape of the area when stitched.

The eyes 101 placed on the head 105 are a preselected see-through color, for a lion light brown, and attached to the head 105 with a felt circle behind the eyes for added security. The eyes 101 are attached with heavy nylon thread initiating from the base of the neck 106 then to one eye 101, to the other eye 101 and back to the base of the neck 106. The length and tension of the thread is adjusted to create the correct look of the cheeks, pull the eyes 101 closer together and secure the eyes 101 to the head portion 105 for safety.

The nose 102 is fabricated of black velboa that is stuffed with fiber to keep its shape. The fiber is tacked in place behind the nose to maintain the shape of the nose and keep the fiber in place. Additional pull in stitching in the nose forms the nostrils.

The basic device is initially formed as a hollow double layered skin incorporating a foam base pad 111. The head 105 is firmly stuffed between the double layered skin with fiber in a manner to round out the cheeks. The neck portion 106 of the head is firmly stuffed to hold up the head 105. The legs 107 are stuffed with fiber. The legs are fabricated with topstitching to accentuate the toes and pads 108 are topstitched in place on each of the footpads. The inside of the base of the body portion 104 is stuffed in the center with two inch thick foam with the space between the initial foam and the skin filled in with foam stuffing to create the cavity 103 area. Tacking stitches, using nylon thread, are made at selected positions particularly the bed area, extending from the inside surface of the cavity 103 to the outside surface of the device 100 to keep the stuffing in place with a matrix. Special care is required to not have the tacking stitches create a dimple or raise an area which would disrupt the smooth surface of the comfort panel 109.

A tail 112 may be added as required to depict the subject matter.

Selected portions of the plush may be clipped to improve the look and ease the styling of the mane. A spray may be used at preselected areas to create accents around the eyes and to add a frosting to the plush material.

A sound generation device 110 may be placed inside the device. The type of sound track incorporated in the device may be preselected to be compatible with the use of the device which may change from time to time. These devices are well known in the art. Access to the device for changing batteries should be incorporated but in conformance with safety requirements should a small child use device.

EXAMPLE 2

Figure 2B:
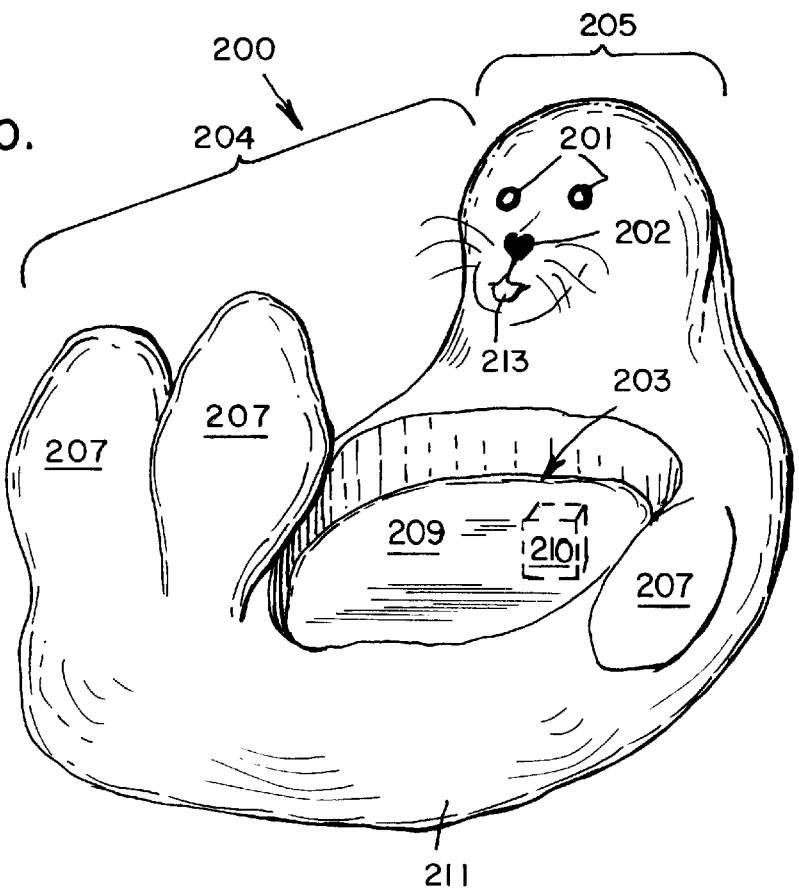
FIGS. 2a and b are perspective views of a device modeled after a harp seal pup according to the teaching of this invention; and, FIG. 3 is a perspective view of a device modeled after a North American bear cub according to the teachings of this invention.
Figure 2A:
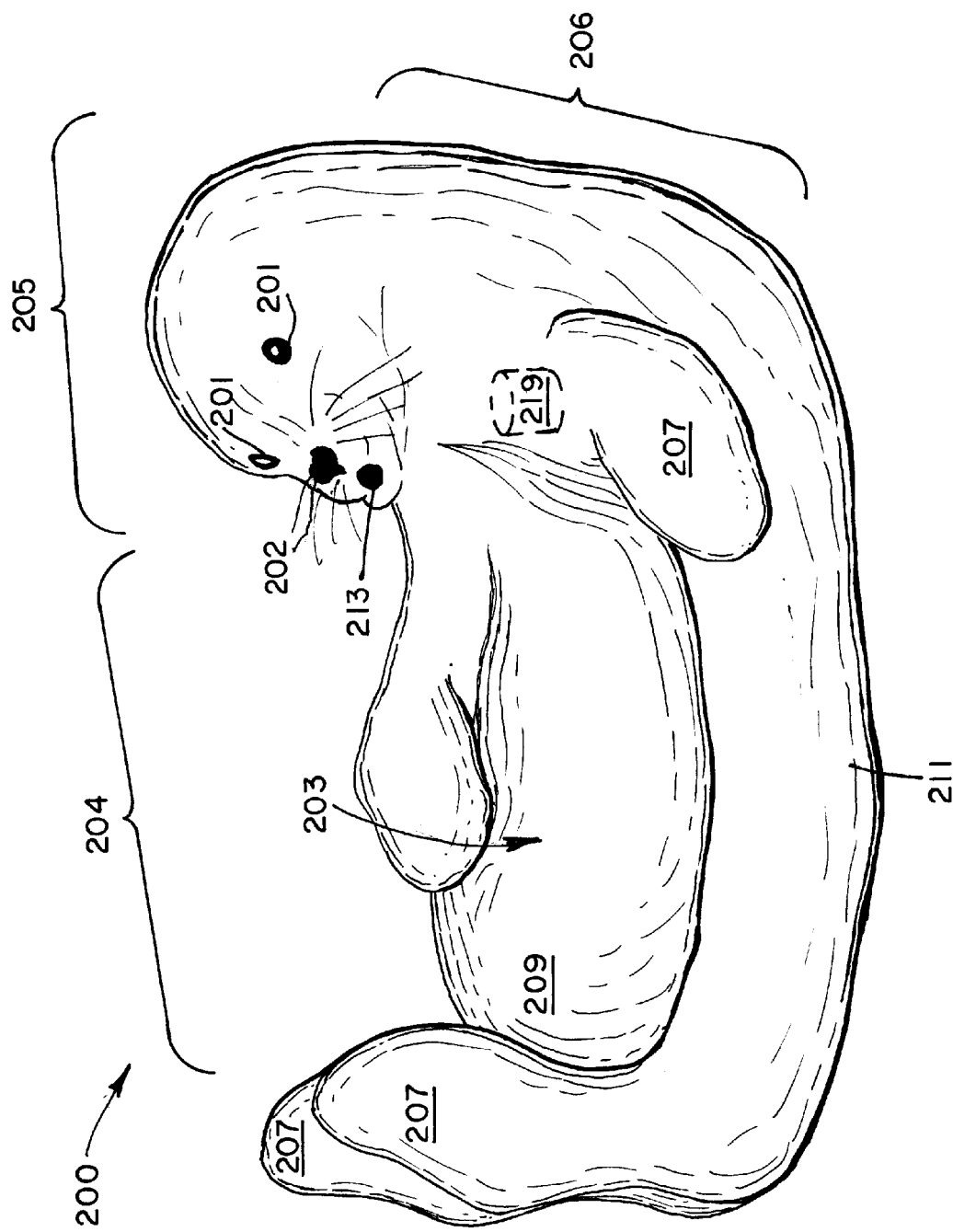

Referring now to the drawing, FIGS. 2a and b. They illustrate the fabrication of plush material in preselected pile depths to simulate the appearance of a baby harp seal, generally designated 200 and having a body portion 204 and a head portion 205.

The overall function of the invention herein is best understood from FIG. 2a. The size of the cavity can be adjusted as well as the height of the walls forming the perimeter of the cavity. In the case of this subject matter the cavity 203 volume is relatively small. The head portion 205 and back leg/flippers 207 are used to enhance the cavity 203 into an enclave.

The eyes 201 placed on the head 205 are a preselected see-through color, for a pup seal dark, and attached to the head 205. The eyes 201 are attached with heavy nylon thread initiating from the base of the neck 206 then to one eye 201, to the other eye 201 and back to the base of the neck 206. The length and tension of the thread is adjusted to create the correct look of the cheeks, pull the eyes 201 closer together and secure the eyes 201 to the head portion 205 for safety.

The nose 202 is fabricated of black velboa which is stuffed with fiber to keep its shape. The fiber is tacked in place behind the nose to maintain the shape of the nose and keep the fiber in place.

The basic device is initially formed as a hollow two layered skin incorporating a foam base pad 211. The head 205 is firmly stuffed between the skins with fiber in a manner to round out the cheeks. The neck portion 206 of the head is firmly stuffed to hold up the head 205. The legs/flippers 207 are stuffed with fiber. The inside of the base of the body portion 204 is stuffed in the center with two inch thick foam with the space between the initial foam and the skin filled in with foam stuffing to create the cavity 203 area. Tacking stitches, using nylon thread, are made at selected positions particularly the bed area, extending from the inside surface of the cavity 203 to the outside surface of the device 200 to keep the stuffing in place. Special care is required to not have the tacking stitches create a dimple or raise an area which would disrupt the smooth surface of the comfort panel 209.

A tongue 213 may be added as required to depict the subject matter.

A sound generation device 210 may be placed inside the device. The type of sound track incorporated in the device may be preselected to be compatible with the use of the device which may change from time to time. These devices are well known in the art. Access to the device for changing batteries should be incorporated but in conformance with safety requirements should the device be used by a small child.

EXAMPLE 3

Figure 3:
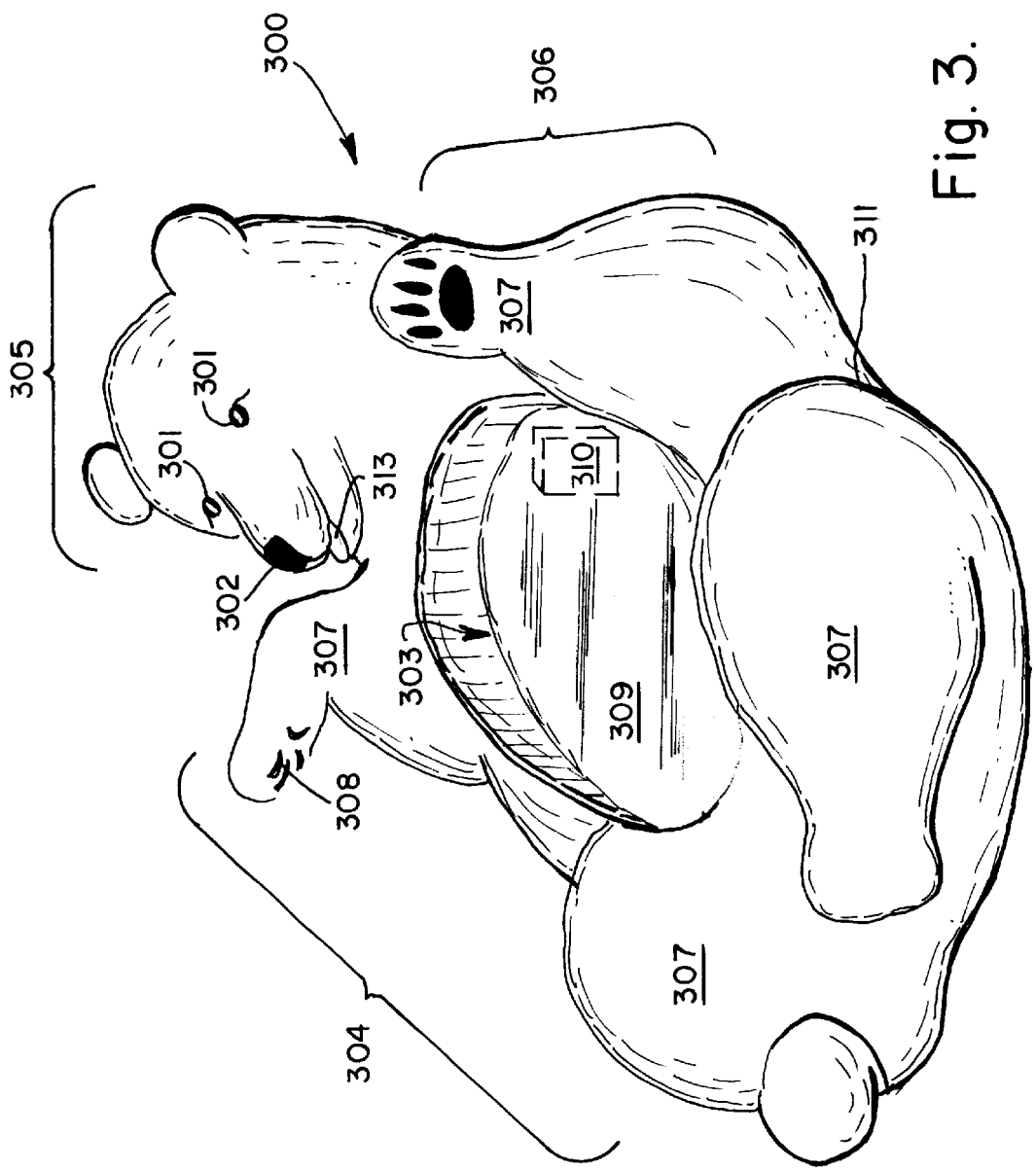

Referring now to the drawing, FIG. 3. There is illustrate the fabrication of plush material in preselected pile depths to simulate the appearance of a North American bear cub, generally designated 300 and having a body portion 304 and a head portion 305.

A cavity 303 is fabricated in the body portion 304 of the device. The size of the cavity 303 can be adjusted as well as the height of the walls forming the perimeter of the cavity 303. The head portion 305 and front and back legs 307 are used to enhance the cavity 303 into an enclave.

The eyes 301 placed on the head 305 are a preselected see-through color, for a bear cub dark, and attached to the head 305. The eyes 301 are attached with heavy nylon thread initiating from the base of the neck 206 then to one eye 301, to the other eye 301 and back to the base of the neck 306. The length and tension of the thread is adjusted to create the correct look of the cheeks, pull the eyes 301 closer together and secure the eyes 301 to the head portion 305 for safety.

The nose 302 is fabricated of black velboa which is stuffed with fiber to keep its shape. The fiber is tacked in place behind the nose to maintain the shape of the nose and keep the fiber in place.

The basic device is initially formed as a hollow two layered skin incorporating a foam base pad 311. The head 305 is firmly stuffed between the skins with fiber in a manner to round out the cheeks. The neck portion 306 of the head is firmly stuffed to hold up the head 305. The legs 307 are stuffed with fiber. The inside of the base of the body portion 304 is stuffed in the center with two inch thick foam with the space between the initial foam and the skin filled in with foam stuffing to create the cavity 303 area. Tacking stitches, using nylon thread, are made at selected positions particularly the bed area, extending from the inside surface of the cavity 303 to the outside surface of the device 300 to keep the stuffing in place. Special care is required to not have the tacking stitches create a dimple or raise an area which would disrupt the smooth surface of the comfort panel 309.

A tongue 313 may be added as required to depict the subject matter.

A sound generation device 310 may be placed inside the device. The type of sound track incorporated in the device may be preselected to be compatible with the use of the device which may change from time to time. Such sounds as a repetitive rhythmical heart beat, a mother's voice or other soothing sounds are recommended. These devices are well known in the art. The device may reproduce a selected sound continuously or a series of selected tracks, may allow the replacement or re-recording of the sound track or tracks, and may include controls for volume, timed turn-on and shut-off. Access to the device for changing batteries should be incorporated but in conformance with safety requirements should the device be used by a small child.

The Panda and Sea Otter are other subject matter which may be candidates for this method to produce a material comfort object.

Smaller versions of material comfort objects designed and fabricated as taught herein may be used as pillows so that only the user's head is contained within the cavity with selected appendages of the selected subject matter such as legs available to further encompass parts of the user such as shoulders and arms with in or under the object.

Since certain change may be made in the above apparatus without departing from the scope of the invention herein involved, it is intended that all matter contained in the above description, as shown in the accompanying drawing, shall be interpreted in an illustrative, and not a limiting sense.

What is claimed is:

1. A method for designing and reproducing a preselected subject matter in a material comfort object incorporating a cavity of a preselected size and shape that is positioned to be enhanced into an enclave which presents an easily accessible exposed surface thereby presenting a comfort panel that is soft, warm and inviting to the user of said material comfort object, comprising the steps of:

first, generating a rendering of said subject matter;

second, incorporating into said rendering a cavity at a location and of a size that does not detract from recognizing the subject matter;

third, enhancing said cavity by placement of selected portions of said subject matter thereby transforming said cavity into an enclave while continuing to present an easily accessible comfort panel as the exposed surface of said enclave to the user;

fourth, selecting areas of said rendering and reproducing said areas in material which resembles the color and texture of the corresponding area of said subject matter;

fifth, stitching together said areas of material to form a double layer skin of said subject matter;

sixth, applying trim to preselected areas of said double layer skin to define or enhance features of said subject matter;

seventh, stuffing said double layer skin to shape said double layer skin into a recognizable form of said subject matter and providing a base pad to said material comfort object;

eighth, tacking said double layer skin through said stuffing thereby providing a matrix to retain the stuffing in place and maintain the shape of said material comfort object; and, ninth, selectively trimming said material and spraying preselected portions of said material to further enhance recognizable features of said subject matter;

thereby producing a material comfort object having a cavity easily accessible by the user wherein said cavity is enhanced into an enclave having an exposed surface for contact comfort to the user thereby generating a sense of safety and nurturing to the user in a manner such that the user of said material comfort object may grow attached to the provider of said material comfort object.

2. A method for designing and reproducing a preselected subject matter in a material comfort object incorporating a cavity that is enhanced into an enclave defined in claim 1 wherein the step of selecting said material includes a preference for plush.

3. A method for designing and reproducing a preselected subject matter in a material comfort object incorporating a cavity that is enhanced into an enclave defined in claim 1 wherein the, step of tacking ensures no dimpling or raised areas are created especially in the accessible comfort panel.

4. A method for designing and reproducing a preselected subject matter in a material comfort object incorporating a cavity that is enhanced into an enclave defined in claim 1 further includes the step of providing a child safe pocket into which a sound reproduction device may be stored so that said sound may be perceived by the user after entering said cavity.

* * * * *